United States Patent [19]

Gregg et al.

[11] 4,342,714
[45] Aug. 3, 1982

[54] PROCESS FOR MAKING VIDEO DISCS

[76] Inventors: David P. Gregg, 3650 Helms Ave., Culver City, Calif. 90230; Kenneth L. Keester, 66 Ocean View Blvd., #66, Santa Barbara, Calif. 93103

[21] Appl. No.: 249,430

[22] Filed: Mar. 31, 1981

[51] Int. Cl.³ .............................................. B29D 17/00
[52] U.S. Cl. .................................... 264/81; 264/101; 264/107; 264/327; 425/810
[58] Field of Search ................. 264/81, 101, 102, 107, 264/327; 425/810

[56] References Cited

U.S. PATENT DOCUMENTS 4,188,240 2/1980 Yoshio .............................. 264/107 X Primary Examiner—Thomas P. Pavelko
Attorney, Agent, or Firm—Keith D. Beecher

[57] ABSTRACT

A process whereby the reflective coating of a video disc is applied to the disc directly in the press in which the disc is stamped by the use of fluid organometallic compounds.

13 Claims, 2 Drawing Figures

PROCESS FOR MAKING VIDEO DISCS

BACKGROUND

In the production of optical video discs, the information to be recorded on the disc is pressed or embossed into one side of a thin transparent substrate formed of a thermoplastic material such as polymethylmethacrylate, by raising the temperature of the substrate to a softened state at which a stamper bearing the recordings is pressed against the substrate, and the substrate is then cooled in contact with the stamper until it reaches its solid state.

In accordance with the prior art practice, a reflective coating is then applied over the substrate by sputtering or vacuum metallizing techniques in a second apparatus, after the substrate has been removed from the press. After further prior art processing, the resulting video disc with its reflective coating may be assembled with another similar disc carrying other recorded information, into a completed video disc bearing video information on both sides which may be optically reproduced.

The prior art practice of removing the thin transparent substrates from the press, and the temporary storage of the substrates, permits the accumulation of airborne dust and oils on the surfaces of the substrates bearing the recorded video information. Furthermore, the sputtering or vacuum deposition processes used in the prior art for applying the reflective coatings to the substrates are usually imperfect on a microscopic scale, especially on the relatively large surface of a typical video disc (which usually is of the order of 300 millimeters in diameter). Moreover, the prior art processes for applying the reflective coatings are incapable of removing debris already present on the information bearing surfaces of the discs. The result is that there are many microscopic defects in the reflective surfaces of the prior art discs, and these defects in the discs, after all the manufacturing steps have been completed, usually result in visible and audible perturbations in the reproduction of the information recorded on the discs when they are operated on the reproducing apparatus.

A principal objective of the present invention is to eliminate the need to move the embossed discs from the press to a second apparatus in order to apply reflective coatings to the discs, and therefore to eliminate the exposure of the discs to the accumulation of foreign matter during the manufacturing process.

By means of fluid organometallic compounds, the metallic atoms within the molecules of the compounds may be made to form a thin metal coating by deposition on foreign surfaces which are heated to the temperature of decomposition of such compounds, this technique being known as pyrolysis or chemical vapor deposition. Although the technique of deposition of metals by the decomposition of organometallic compounds, or gas plating as it is called, is known, the metals so produced have been used primarily in order to secure high orders of purity. In the practice of the present invention, however, the organometallic deposition process is employed in order to obtain an optical surface of relatively high and uniform reflectivity over a large surface area.

The range of fluid organometallic compounds which may be used in the process of the invention is wide, and although both liquid and gaseous forms may be used, the examples to be described herein are of the type which employ a metallic compound, such as aluminum, in its gaseous form for plating a reflective surface on the substrate of a video disc. The gaseous form of the aluminum may be, for example, alkyl, alkyl halide, alkyl hydride, hydride halide, and the like, compounds; and these will be referred to collectively herein as alkylaluminum, although it is to be understood that other organometallic compounds such as, tetramethyl tellurium, and the like, may be used in the practice of the process of the invention.

DETAILED DESCRIPTION OF THE ILLUSTRATED EMBODIMENT

Figure 1:
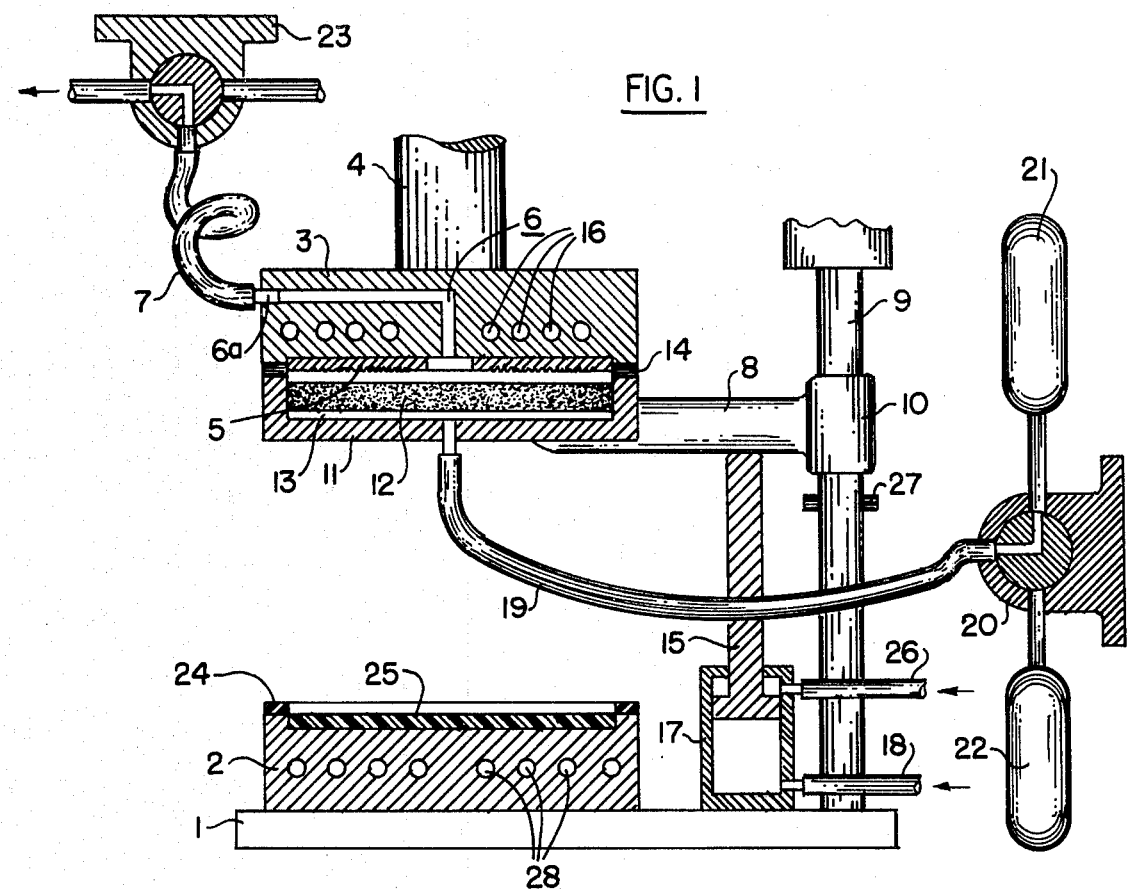
FIG. 1 is a schematic representation of typical apparatus for carrying out the concepts of the invention, with the apparatus in a first operating position.

In the drawing, elements 1, 2, 3 and 4 constitute the basic parts of an hydraulic press of the type presently used for pressing phonograph and video disc records. The press includes a base 1, and a lower platen 2 is mounted on the base. An upper platen 3 is attached to the end of an hydraulic piston 4. Both the platens 2 and 3 have appropriate heating and cooling means 16 extending therethrough.

The representation of FIG. 1 shows the press in its open and raised position. The video disc stamper 5 which is formed, for example, of nickel, and which is embossed with the information to be recorded on the video discs, is affixed to the lower surface of platen 3. In the illustrated embodiment, platen 3 contains a passage 6 which is centrally located over the stamper 5, and which coincides with a central hole in the stamper. The passage 6 extends radially to the outer edge of platen 3, and a tube 7 is fitted over a tubular nipple 6 which protrudes from the end of the passage.

The apparatus includes an arm 8 which is mounted on a bearing 10 which, in turn, is rotatable about the axis of a mounting post 9, and which is also movable vertically along the post. A shallow cylinder 11, closed at its bottom end, is mounted on the end of the arm 8. A diffusing member 12 is supported in the cylinder 11, and is displaced from its bottom end to form a plenum chamber 13. A circular elastomeric gasket 14 is mounted on the peripheral edge of platen 3 to form a seal between the cylinder 11 and the platen, when the apparatus is in the closed position shown in FIG. 1.

The sealing pressure is created by the thrust of a piston 15, the piston being mounted in an hydraulic cylinder 17. The upper end of the piston bears against the lower side of arm 8, and when the piston is in the extended position shown in FIG. 1, it causes the arm to move cylinder 11 upwardly against platen 3 to seal the two elements together. The piston 15 is moved to its upper position of FIG. 1 by the introduction of pressurized hydraulic fluid through a tube 18 into the lower end of cylinder 17.

In the first step of operation of the process of the invention, platen 3 is heated by steam, fluorocarbon gas or other convenient means to the temperature of pyrolysis of, for example, alklyaluminum, through elements 16. The heat is readily conducted to stamper 5. A supply of relatively chemically inactive gas, such as argon, is fed through a flexible hose 19, and through a central hole in the base of cylinder 11, to the plenum chamber 13. This gas is diffused through porous member 12 to the heated stamper 5. The inactive gas then passes through the central hole of the stamper and through passage 6 and hose 7 to the exterior of the apparatus. The inactive gas is obtained, for example, from a pressurized supply source 21, and is fed to the apparatus by appropriate adjustment of a manually or automatically operated valve 20.

In the second step of operation of the process, valve 20 is turned to shut off the supply of the inactive gas, and to turn on a supply of alkylaluminum gas from a pressurized supply source 22. The alkylaluminum gas passes through the tube 19 to the plenum chamber 13, and through the porous member 12 to the space between the porous member 12 and the bottom surface of stamper 5, which surface carries the variations to be formed on the video disc. The alkylaluminum gas also passes out through the passage 6 to the tube 7. As the alkylaluminum gas passes through the apparatus, it decomposes to form a metal coating of, for example, aluminum, on the hot, exposed surface of the stamper 5. When the deposited coating is of the desired thickness, valve 20 is returned to its position illustrated in FIG. 1 to readmit the inactive gas, so as to purge the gaseous path of any residual alklylaluminum gas and its gaseous decomposition products through hose 7 and valve 23 to be disposed of by any commonly known means.

In the next step of the process, hydraulic fluid is introduced through tube 26 to cylinder 17 to lower piston 27. The bearing 10 moves down on support post 9 against a stop collar 27, and the arm 8, and cylinder 11, together with element 12, move down and away from the platen 3. The arm 8, together with the cylinder 11 and member 12, are then turned manually, or by appropriate automatic means, approximately 90° in the horizontal plane, to the position shown in FIG. 2.

Figure 2:
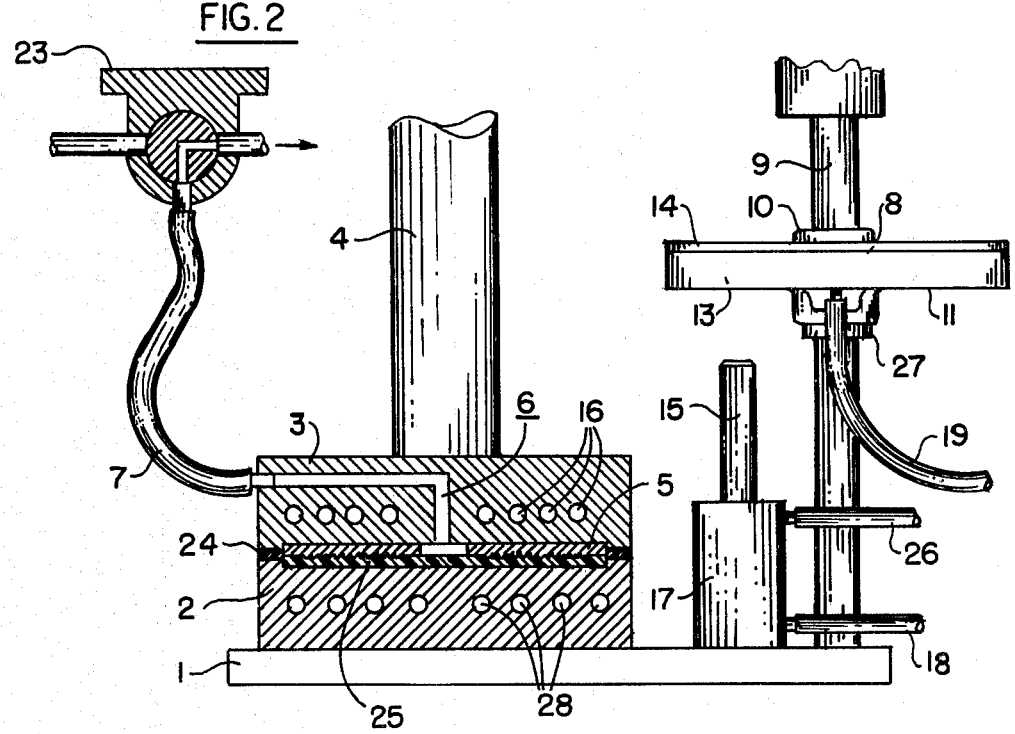
FIG. 2 is a schematic representation of the apparatus in a second operating position.

Coincident with the first step of the process described above, a quantity of appropriate thermoplastic material 25 is placed in a cavity in the surface of the second platen 12, and heating elements 28 are activated to cause the material to reach a molten state. In the next step of the process, the hydraulic piston 4 drives the heated platen 3 and the stamper 5 with its reflective coating into intimate and uniform contact with the molten surface of the plastic substrate 28, as shown in FIG. 2. Simultaneously the gasket 24 of appropriate elastomeric material creates an intimate seal between the platens 2 and 3 such that, as valve 23 is rotated manually or automatically, a vacuum is created through the path of 6, 7 and 23 to a remote vacuum source. The residual gases so removed between the metallically coated stamper surface and the substrate surface permit uniform transfer of the metallic coating and perfect, bubble-free adhesion of the metallic coating to the plastic substrate. At this time, a cooling fluid is introduced through elements 16 of the upper platen 2 and elements 28 of lower platen 3. When the plastic substrate 25 is suitably cooled and hardened, the hydraulic piston 4, together with platen 3 and stamper 5, are raised to their position of FIG. 1. However, because the reflective metal coating has been bonded to the plastic disc 28 with an adhesive force greater than that which attached it to stamper 5, the reflective coating is transferred from the stamper to the plastic disc.

The arm 8 may then be turned to its position of FIG. 1, and lifted by the piston 15 against platen 3 to reseal the cylinder 4 against the platen, and the process may be repeated for the next disc to be formed.

To facilitate the transfer of the reflective aluminum coating, the embossing surface of stamper 5 is coated by sputtering plating, or any other convenient means, with a thin layer of any appropriate material which is known to have low adhesive properties for aluminum. The temperatures of the upper and lower platens 2 and 3 of the press are independently variable by means of the elements 16 and 28 respectively. For example, the upper platen may be heated to approximately 550° F. during pyrolysis, whereas the plastic material in the lower platen is heated to approximately 425° F. Moreover, the upper, hotter, platen 3, and therefore the stamper 5, is cooled at a faster rate than the lower, plastic bearing platen 2. In this way, the different temperature coefficients of expansion of the metal stamper 5 and the plastic material in the lower platen 2 are compensated in order to reduce the radial shear stresses which are normally encountered, especially in the outermost radial zones of the plastic disc 25. Such stresses, which often destroy the outer zones of the embossed video recordings when video discs are made by usual prior art processes are thereby avoided in the process of the present invention.

It will be appreciated that while a particular embodiment of the invention has been shown and described, modifications may be made, and it is intended in the following claims to cover all modifications which come within the true spirit and scope of the invention.

What is claimed is:

1. A process for recording video information on a plastic substrate which comprises: providing a stamping element having embossments on a surface thereof representing selected video information; coating the surface of the stamping element with a selected reflective material by pyrolysis; providing a plastic substrate; moving the stamping element against a surface of the plastic substrate to cause such surface to be embossed with embossments representing the selected video information and also causing the reflective material to be bonded to the embossed surface of the plastic substrate; and withdrawing the stamping element from the surface of the plastic substrate to cause the reflective coating to be transferred from the stamping element to the plastic disc.

2. The process defined in claim 1, in which said stamper is coated with a layer of selected material having lower adhesive properties with respect to the reflective metal than said plastic substrate.

3. The process defined in claim 1, and which includes the step of creating a vacuum between the stamping element and the plastic substrate to remove residual gases.

4. The process defined in claim 1, and which includes the step of heating the plastic substrate to a molten state.

5. The process defined in claim 4, and which includes the step of raising the temperature of the stamper to a selected elevated temperature, and passing an organometallic compound in fluid state over the surface of the stamper to form the reflective coating by decomposition of said compound.

6. The process defined in claim 5, in which said organometallic compound is passed in its gaseous state over the surface of the stamper.

7. The process defined in claim 5, in which said organometallic compound is alkylaluminum.

8. The process defined in claim 5, in which the stamper is heated to a greater temperature than the temperature of the molten plastic substrate.

9. The process defined in claim 5, and which includes the step of cooling the stamper and the plastic substrate when in contact with one another.

10. The process defined in claim 9, in which the stamper and the plastic substrate are cooled at different rates.

11. The process defined in claim 1, in which said plastic substrate is a thermoplastic material.

12. The process defined in claim 11, in which said plastic substrate is transparent.

13. The process defined in claim 12, in which said plastic substrate is polymethylmethacrylate.

* * * * *